(12) United States Patent
Palikuqi et al.

(10) Patent No.: US 10,668,374 B2
(45) Date of Patent: Jun. 2, 2020

(54) SYSTEM AND METHOD FOR BINDING GLOBAL OBJECTS IN A CLIENT-SERVER ARCHITECTURE

(71) Applicant: MZ IP Holdings, LLC, Palo Alto, CA (US)

(72) Inventors: Ajk Palikuqi, San Jose, CA (US); Garth Gillespie, Palo Alto, CA (US); Arya Bondarian, Fountain Valley, CA (US); Jai Kim, San Mateo, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

(21) Appl. No.: 15/878,549

(22) Filed: Jan. 24, 2018

(65) Prior Publication Data

US 2018/0207528 A1 Jul. 26, 2018

Related U.S. Application Data

(60) Provisional application No. 62/450,176, filed on Jan. 25, 2017.

(51) Int. Cl.
*A63F 13/35* (2014.01)
*A63F 13/87* (2014.01)
(Continued)

(52) U.S. Cl.
CPC .............. *A63F 13/35* (2014.09); *A63F 13/61* (2014.09); *A63F 13/87* (2014.09); *G06Q 50/01* (2013.01);
(Continued)

(58) Field of Classification Search
CPC ..... G06F 8/20–78; H04L 51/32; H04L 67/38; H04L 67/1095; A63F 13/35; G06Q 50/01; H04W 4/21
(Continued)

(56) References Cited

U.S. PATENT DOCUMENTS 8,560,956 B2 * 10/2013 Curtis ..................... G06F 17/21
715/205
8,769,524 B2 * 7/2014 Bhullar ................... G06F 16/23
717/173
(Continued)

OTHER PUBLICATIONS

Crager et al., "Facebook All-in-One for Dummies," For Dummies, Apr. 28, 2014.
(Continued)

*Primary Examiner* — Marina Lee
(74) *Attorney, Agent, or Firm* — Goodwin Procter LLP (57) ABSTRACT

Implementations of the present disclosure are directed to a computer-implemented method, a system, and an article for managing updates to environment objects within an online application. The method can include, for example, updating, by one or more computer processors on a server, an environment object for use within an online application on a client device to create an updated environment object, and transmitting, by the one or more computers processors on the server, a message to the client device using the online application that the environment object has been updated. A determination is made that the client device requires the updated environment object, and, based on the determination, the updated environment object is transmitted to the client device.

20 Claims, 4 Drawing Sheets

(51) Int. Cl.
*H04L 12/58* (2006.01)
*H04L 29/06* (2006.01)
*G06Q 30/06* (2012.01)
*A63F 13/61* (2014.01)
*G06Q 50/00* (2012.01)
*H04L 29/08* (2006.01)
*H04W 4/21* (2018.01)

(52) U.S. Cl.
CPC .............. *H04L 51/04* (2013.01); *H04L 51/32* (2013.01); *H04L 67/1095* (2013.01); *G06Q 30/0601* (2013.01); *H04L 67/38* (2013.01); *H04L 67/42* (2013.01); *H04W 4/21* (2018.02)

(58) Field of Classification Search
USPC .................................................. 717/168–178
See application file for complete search history.

(56) References Cited

U.S. PATENT DOCUMENTS

| | | | | |
|---|---|---|---|---|
| 9,122,556 | B2* | 9/2015 | Mahajan | G06F 8/43 |
| 9,400,644 | B2* | 7/2016 | Mahajan | G06F 8/43 |
| 2007/0207860 | A1* | 9/2007 | Yamauchi | A63F 13/12 |
| | | | | 463/42 |
| 2011/0119594 | A1* | 5/2011 | Tsao | G06F 9/526 |
| | | | | 715/737 |
| 2011/0208822 | A1* | 8/2011 | Rathod | G06F 16/9535 |
| | | | | 709/206 |
| 2012/0264520 | A1* | 10/2012 | Marsland | H04L 67/38 |
| | | | | 463/42 |
| 2013/0073400 | A1* | 3/2013 | Heath | G06Q 30/02 |
| | | | | 705/14.73 |
| 2014/0012949 | A1* | 1/2014 | Meyers | H04L 67/1095 |
| | | | | 709/217 |
| 2014/0189676 | A1* | 7/2014 | Mahajan | G06F 8/43 |
| | | | | 717/170 |
| 2015/0080128 | A1* | 3/2015 | Terrell, IV | A63F 13/65 |
| | | | | 463/31 |
| 2015/0261813 | A1* | 9/2015 | Pappula | G06F 16/95 |
| | | | | 707/758 |
| 2015/0326651 | A1* | 11/2015 | Ormseth | H04L 67/22 |
| | | | | 709/204 |
| 2015/0370551 | A1* | 12/2015 | Mahajan | G06F 8/43 |
| | | | | 717/170 |
| 2016/0335075 | A1* | 11/2016 | Mahajan | G06F 8/43 |
| 2017/0359293 | A1* | 12/2017 | Xu | H04L 51/32 |
| 2018/0207528 | A1* | 7/2018 | Palikuqi | A63F 13/61 |

OTHER PUBLICATIONS

Hume, "Progressive Web Apps," Manning Publications, Jul. 25, 2017.
Psaltis, "Streaming Data: Understanding the real-time pipeline," Manning Publications, Jun. 22, 2017.
Tanenbaum et al., Distributed Systems: Principals and Paradigms (Second Edition), Prentice Hall, Oct. 23, 2008.
Vikram Vaswani, "PHP: A Beginner's Guide," McGraw-Hill Education, Oct. 12, 2008.
Wikipedia: "Mobile Web," accessed on the Internet at http://en.wikipedia.org/w/index/php?title=Mobile_Web&oldid=755184942; Dec. 16, 2016, 6 pages.
Wikipedia: "Saved game," accessed on the Internet at http://en.wikipedia.org/w/index/php?title=Saved_game&oldid=761507939; Jan. 23, 2017, 6 pages.
Int'l Search Report and Written Opinion of the ISA/EP in PCT/US2018/015043; dated Mar 16, 2018; 14 pgs.

\* cited by examiner

FIG. 4

# SYSTEM AND METHOD FOR BINDING GLOBAL OBJECTS IN A CLIENT-SERVER ARCHITECTURE

CROSS-REFERENCE TO RELATED APPLICATIONS

This application claims the benefit of U.S. Provisional Patent Application No. 62/450,176, filed Jan. 25, 2017, the entire contents of which are incorporated by reference herein.

BACKGROUND

The present disclosure relates to multi-user, client-server based systems, and, in particular, to systems and methods for managing the updating of user data to a large audience of users.

In general, an online platform, such as, for example, a social network, a multi-player online game or a messaging service, can be used by hundreds of thousands or even millions of individuals who use client devices to interact with other individuals within the platform. For example, in an online gaming implementation, users may interact with each other in a virtual environment. The users may work to accomplish tasks, acquire assets, or achieve a certain score in the online game. Some games require or encourage players to form groups or teams that can play against other players or groups of players. In a social network, multiple users may be logged in and "following" or receiving content such as text, images and video from other users in real or near-real time. In a real-time messaging system, users may receive messages from or subscribe to services that distribute information (e.g., road conditions, flight status, sports scores, stock market quotes, etc.) to millions of users simultaneously.

The state of a virtual environment, network or system can change over time as users provide input to the system and various events unfold as a result of the input. It is desirable for the state of the system to be consistent for all users at any given time, so each user is kept apprised of activity and no user(s) have an unfair advantage or access.

SUMMARY

Implementations of the systems and methods described herein can be used to manage the distribution of updated environment objects within an online application. The objects can include game objects, social media content, representations of infrastructure elements (roads, methods of transport, etc.), and the like that are created and updated when users (also referred to herein as "players") provide input to client devices for interacting with the online application. Alternatively or additionally, at least a portion of the updates can be created or initiated by a server in communication with the client devices. The updates may be caused by events within the application or derived events, which can be or include, for example, an event that is predicted to occur as a result of one or more application events and/or other derived events. The updated environment objects are proliferated out to the users as the users interact with, require, or are scheduled to receive the updates. This ensures that all users experience the same state of the application as time progresses without negatively impacting system performance or creating unnecessary application latency.

In one aspect, the subject matter described in this specification relates to a computer-implemented method for updating environment objects within an online application. The method includes updating, by one or more computer processors on a server, an environment object for use within an online application on a client device to create an updated environment object and transmitting, using the computer processors, a message to the client device using the online application that the environment object has been updated. A determination is made using the computer processors on the server whether the client requires the updated environment object, and based on the determination, the updated programming object is transmitted to the client device, thereby updating the environment object on the client.

In some embodiments, the determination that a user of the client requires the updated environment object is based, at least in part, on message to the server indicating that a user of the client is interacting with the environment object. In other instances, the determination that a user of the client requires the updated environment object is based, at least in part, on an updated user state, such as active or inactive, or being a member of a particular user group based on certain commonalities. In some cases, the determination that a user of the client requires the updated environment object is based, at least in part, on a scheduled update of the environment object. The online application may be an online multi-player game (in which case the environmental object comprises a collection of virtual items available for purchase), a social network (in which case the environmental object comprises online content or an image) or a logistical application.

In another aspect, the subject matter described in this specification relates to a system. The system includes one or more computer processors programmed to perform operations including: updating, by one or more computer processors on a server, an environment object for use within an online application on a client device to create an updated environment object and transmitting, using the computer processors, a message to the client device using the online application that the environment object has been updated. A determination is made using the computer processors on the server whether the client requires the updated environment object, and based on the determination, the updated programming object is transmitted to the client device, thereby updating the environment object on the client.

In some embodiments, the determination that a user of the client requires the updated environment object is based, at least in part, on message to the server indicating that a user of the client is interacting with the environment object. In other instances, the determination that a user of the client requires the updated environment object is based, at least in part, on an updated user state, such as active or inactive, or being a member of a particular user group based on certain commonalities. In some cases, the determination that a user of the client requires the updated environment object is based, at least in part, on a scheduled update of the environment object. The online application may be an online multi-player game (in which case the environmental object comprises a collection of virtual items available for purchase), a social network (in which case the environmental object comprises online content or an image) or a logistical application.

In some examples, the user-initiated events and the derived game events can be stored on each client device according to times for the user-initiated events and the derived game events. Each client device can make an identical determination of the state of the virtual environment over time. The operations can include: receiving at a server the user-initiated events from the client devices;

determining at the server the plurality of derived game events based on the user-initiated events; storing on the server the user-initiated events and the derived game events in one or more server event queues; and determining on the server the state of the virtual environment over time, according to the stored user-initiated events and the derived gam events.

In another aspect, the subject matter described in this specification relates to an article. The article includes a non-transitory computer-readable medium having instructions stored thereon that, when executed by one or more computer processors, cause the computer processors to perform operations including: updating, by one or more computer processors on a server, an environment object for use within an online application on a client device to create an updated environment object and transmitting, using the computer processors, a message to the client device using the online application that the environment object has been updated. A determination is made using the computer processors on the server whether the client requires the updated environment object, and based on the determination, the updated programming object is transmitted to the client device, thereby updating the environment object on the client.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
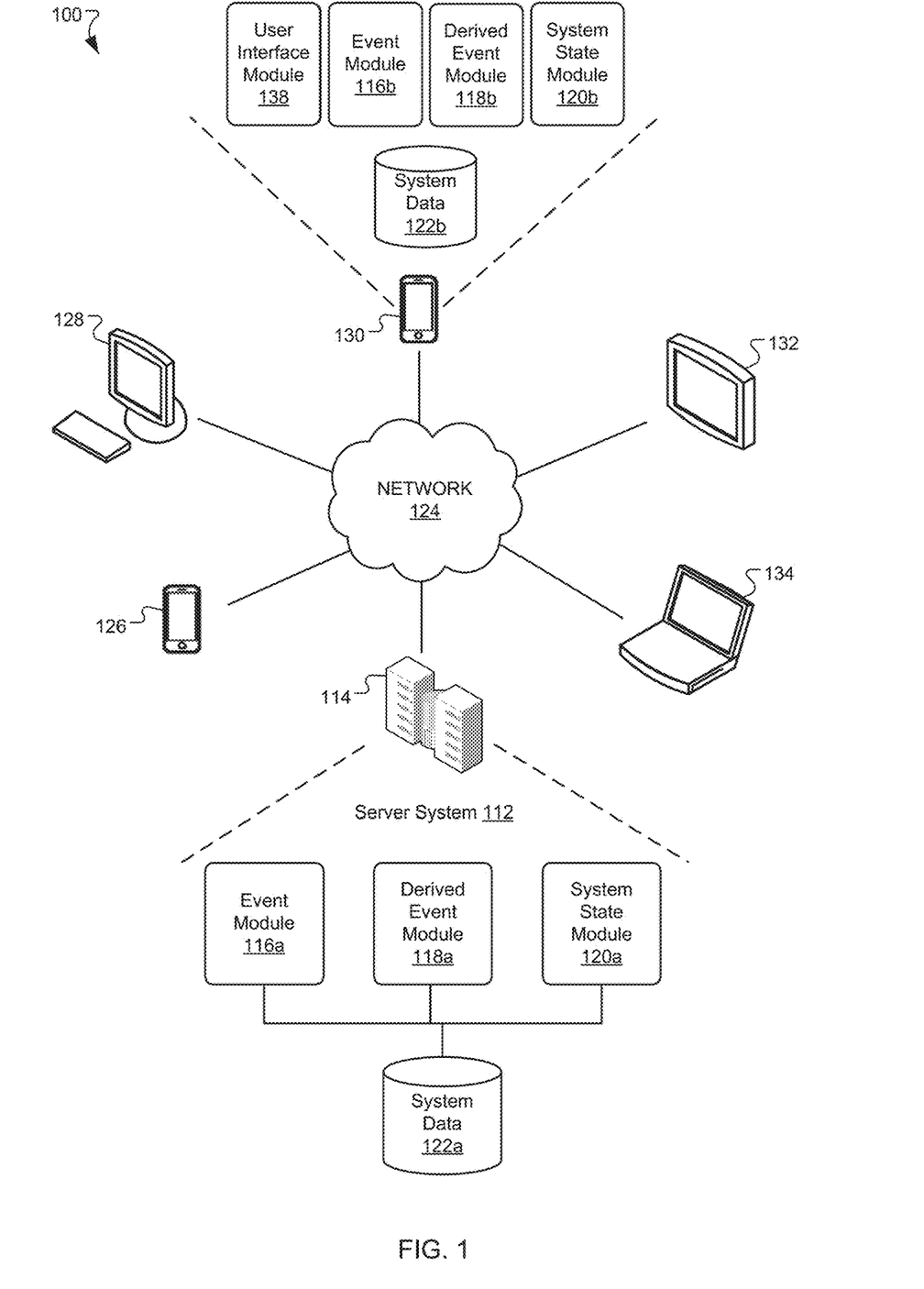
FIG. 1 is a schematic diagram of an example system for managing event data in a multi-user online system.

FIG. 1 illustrates an example system 100 for managing event data and maintaining a consistent system state across client devices for a multi-user access system. A server system 112 provides functionality for processing events, computing derived events, updating the system state, and/or monitoring user interactions with the system over time. The server system 112 includes software components and storage devices or databases that can be deployed at one or more data centers 114 in one or more geographic locations, for example. The server system 112 software components can include, for example, an event module 116a, a derived event module 118a, and a system state module 120a. The software components can include subcomponents that can execute on the same or on different individual data processing apparatus. The server system 112 databases can include, for example, a system data database 122a. The storage devices can reside in one or more physical storage systems. The software components and data will be further described below.

An application, such as, for example, a web-based application, can be provided as an end-user application to allow users to interact with the server system 112. For purposes or illustration and not limitation, the end-user application may be a multi-player game (e.g., a mobile game, such as, for example, a massively multiplayer online game or the like), a social network, a subscription-based messaging system, a broadcast system, or combinations thereof. Other suitable end-user applications are possible. The end-user application can be accessed through a network 124 (e.g., the Internet) by users of client devices, such as a smart phone 126, a personal computer 128, a smart phone 130, a tablet computer 132, and a laptop computer 134. Other client devices are possible. Each client device can include suitable software components and storage devices or databases for providing application functionality. The client device software components can include, for example, a user interface module 138, an event module 116b, a derived event module 118b, and a system state module 120b. The storage or database components can include a system data database 122b. While FIG. 1 depicts the user interface module 138, the event module 116b, the derived event module 118b, the system state module 120b, and the system data database 122b as being associated with the client device 130, it is understood that each of the client devices 126, 128, 130, 132, and 134 can include the user interface module 138, the event module 116b, the derived event module 118b, the system state module 120b, and/or the system data database 122b.

Figure 2:
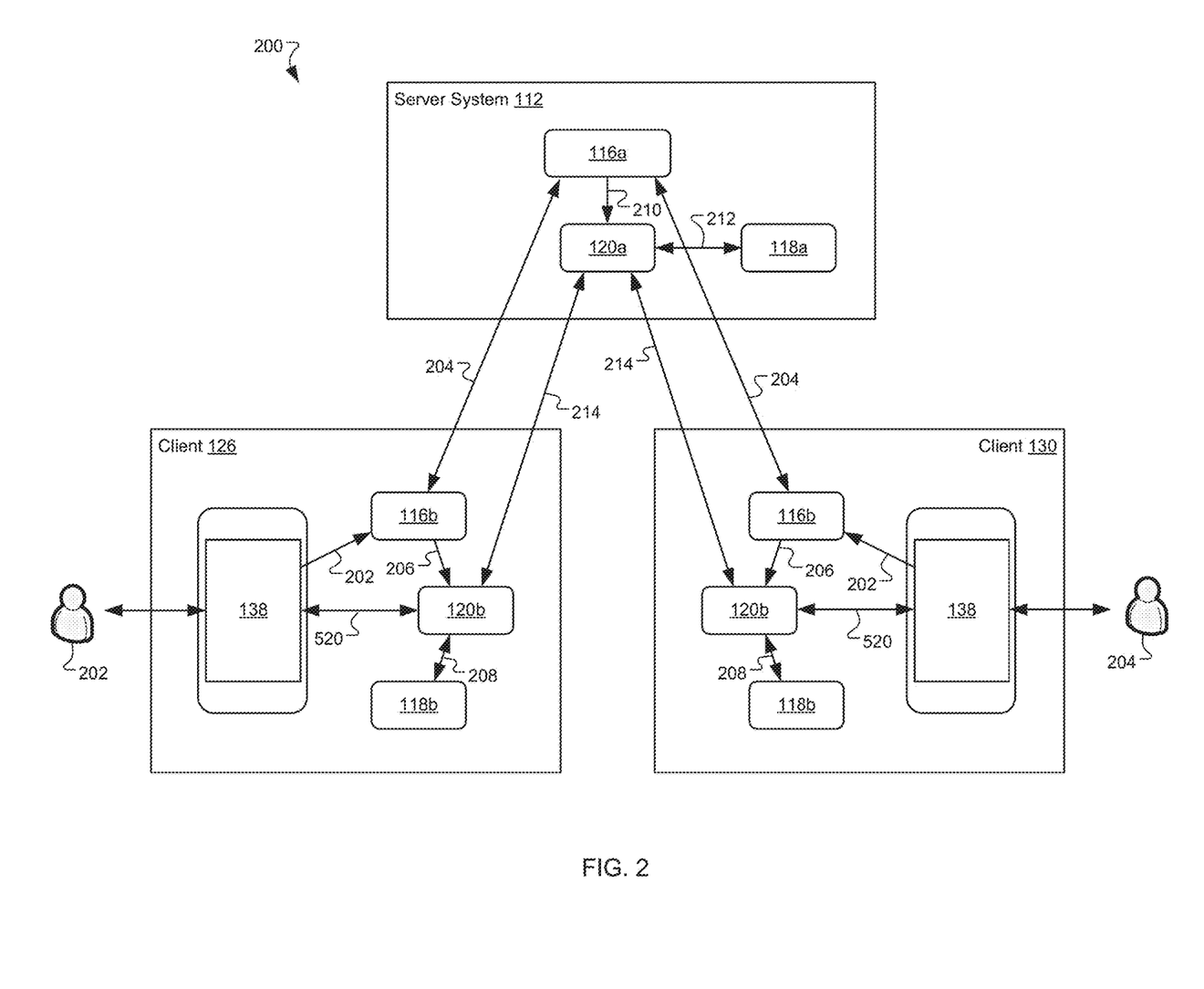
FIG. 2 is a schematic diagram of an example system in which two client devices interact with a server for a multi-user online system.

FIG. 2 depicts an example system 200 in which two users 202 and 204 use respective client devices 126 and 130 to interact with the server system 112 of an online system. Each of the users 202 and 204 can provide input to the respective client devices 126 and 130. The input can be or include, for example, a tap or swipe on a touch screen, a point and click with a mouse, one or more entries on a keyboard and/or uploading of content such as pictures, text, and video. Data corresponding to the input is sent from the user interface module 138 along a path 202 to the event module 116b, which determines and/or manages events for the system based on the user input. The events may be, for example, actions or movements taken by a player or the player's character or avatar in a virtual environment of an the online game, or, in other instances, posts, uploads or other content created, uploaded or provided by a user of a social network. In some implementations, at least a portion of the events can be generated on the server system 112. For example, the server system 112 can create events that occur randomly or at specific times and/or places in the virtual environment, or messages that are distributed to random users. The events generated on the client devices 126 and 130 and/or on the server system 112 can be or include, for example, a player movement, an interaction with another user, a deployment of resources (e.g., soldiers, weapons, or defenses), uploading of content, an interaction with a virtual object, and/or an interaction with a character in the virtual environment. Other game events are possible.

In preferred examples, events generated on each client device (and/or on the server system 112) are shared with the other client device and any other client devices participating in the online system. For example, the events can be sent from the event module 116b on each client device 126 or 130 along a path 204 to the event module 116a on the server system 112. The event module 116a on the server system 112 can forward each event (generated on the client devices 126 and 130 and/or on the server system 112) to the event modules on the other client devices (e.g., using the path 204). As additional events are generated during further user interactions and are sent to the event module 116a on the server system 112, the additional events can be distributed to the other client devices. In this way, each client device 126 and 130 can obtain a complete set of events generated by all the client devices and/or any servers participating in the system or a portion thereof.

In certain implementations, each event can be associated with a time at which the event is scheduled to occur. When the scheduled time is reached, the event module 116b on each client device 126 or 130 can forward the event along a path 206 to the system state module 120b. The system state module 120b can update a state of the system according to the event. For example, if the event involves updating a profile of a user at a certain time, the system state module 120b can update the state of the system by updating the data associated with the user's profile at that time.

Additionally or alternatively, each event can trigger certain derived events for the online system. Derived events can create, modify or delete environment objects within the online system, such as, for example, changing the condition, profile or characteristics of social network settings, the addition or removal of environment objects or characters in a virtual gaming environment, or an updated status of an event in a logistical application (e.g., traffic, road closures, an auto accident, delayed flight, train delays, etc.) for which users are to be notified. For example, when a player changes position in the virtual environment, a virtual object may appear in the virtual environment or other environment objects (e.g., virtual characters, people, or animals) may move in response to the player movement. Such derived events can be determined on the client devices 126 and 130 using the derived event module 118b. When the system state module 120b receives an event from the event module 116b, for example, the event can be forwarded along a path 208 to the derived event module 118b. Alternatively or additionally, the event can be forwarded directly from the event module 116b to the derived event module 118b. The derived event module 118b can then determine any derived events corresponding to the event and can schedule times at which such derived events will occur in the system and/or be messaged or otherwise provided to the users. Alternatively or additionally, the derived event module 118b can recalculate or delete any derived events that are no longer predicted to occur or are no longer relevant, for example, due to other intervening events or derived events.

When the system state module 120b updates the system state according to the events and the derived events, the system state module 120b can send the updated system state to the user interface module 138. A rendering of the updated state, the virtual environment, and/or the relevant content can be generated by the user interface module 138 and presented to the users 202 and 204 of the client devices 126 and 130, respectively. The rendering can include, for example, text, images, video, audio, and/or haptic feedback. Each of the users 202 and 204 can respond to the updated rendering of the system state by providing further input to the user interface module 138. The further input can be processed and used to further update the system state, as described herein.

In various examples, as the client devices 126 and 130 update the state according to the events and the derived events, the server system 112 can update the server's version of the system state by processing the events and the derived events. For example, when an event is scheduled to occur, the event module 116a on the server system 112 can forward the event along a path 210 to the system state module 120a. The system state module 120a can update the state of the system according to the event. Additionally or alternatively, the event can be forwarded along a path 212 to the derived event module 118a, which can determine any derived game events corresponding to the event. When a scheduled time for a derived event is reached, the derived event module 118a can send the derived event along the path 212 to the system state module 120a. The system state module 120a can update the system state according to the derived event.

In various examples, the server's version of the system state can be an official version of the system state and can be used to monitor or confirm the system state on each client device. The server's version of the system state can be used, for example, to prevent any cheating occurring on the client devices 126 and 130 or to update the game state on the client devices 126 and 130. For example, the server system 112 can compare the server's listing of past, present, and/or future events and/or derived events with listings of past, present, and/or future events and/or game events on the client devices 126 and 130. Additionally or alternatively, the server system 112 can use a path 214 to compare the server's version of the system state with the system states determined or otherwise maintained by the system state modules 120b on the client devices 126 and 130. By inspecting events and/or the system states on the client devices 126 and 130, the server system 112 can verify that the events are permissible and within any rules or terms of use of the system and/or that the system states are accurate. Without this independent check by the server system 112, for example, hackers could generate and submit malicious and/or fraudulent events in an attempt to gain an unfair advantage.

The server's official version of the system state can also be used to bind a global object to each individual user as the system state changes. With prior approaches, to be brought up-to-date, a late-arriving client device or client devices that have not used, viewed or otherwise interacted with environment elements affected by events could be required to process all events that occurred in the past prior to the arrival of the client device, or as events occur, address each individual user and update the user's status for each new event. Such an approach, however, becomes expensive as the number of users increases.

With the systems and methods described herein, however, the server system 112 can send a current object state to the client devices, such that the client devices can be synchronized with the system state and/or other client devices in a manner that does not tax processing resources or bandwidth and does not negatively impact the user experience.

In preferred implementations, the client devices 126 and 130 and the server system 112 are configured to update environment objects based on a user state. To maintain consistency and uniformity of the system state across all client devices and the server system 112, the event modules 116a and 116b, the derived event modules 118a and 118b, and the system state modules 120a and 120b can be configured to identify environment objects on a user-by-user basis as either "current" or "stale." In one embodiment, a programming object is created representing the combination of an environment object and the user, and a rule-set is associated with the programming object that defines how and when the environment object is updated for that user. In some cases, the environment object is a component on an application screen (e.g., a profile picture, game element, etc.) that is stale.

For example, when an event occurs that is meant to update an environment object (e.g., a new road is added to a map, a new item is added to a set of weapons for a game, or a new piece of content is added to a user profile), all programming objects can initially be flagged as "stale," meaning each user's instance of that environment object requires an update to reflect the new state. However, because each individual user's need to see the updated environment object varies based on their own state (e.g., online, offline, interacting with the object, likely to interact with the object, etc.), the order, frequency and speed with which the updated environment object is sent to the user's client is based on the user's state, thus managing the effect on system performance.

In some instances, the users' "state" may be based on a user grouping. Users may be grouped in a manner such that the updated environment object(s) are distributed is waves. For example, users that are currently interacting with the system (e.g., an "active" state) may be grouped into an "online" group, and updates sent out immediately. Other users who are not interacting with the system may be deemed "offline," and either updated after those classified as online, or individually as they log in. In such instances, sub-groups may be further identified to further segregate the users by, for example, geography (those in a certain city receive the updates), or other demographic parameters associated with the user(s). In each case, the users' client devices can be notified that the environment object is out of date using, for example, a simple bit message or ping (e.g., via XMPP or other suitable socket mechanism) to minimize network traffic and application latency. The next time the user interacts with the environment object, a message (e.g., HTTP request or the like) can be sent from the client to the server with instructions to bind the updated environment object with a new programming object. On the server side, a duplicate of the programming object can be created for those users that request or require an updated environment object. The user-specific programming object is then sent back to the client to inform the client that the programming object has been updated.

In some instances, the distribution of the updated environment object may be triggered based on the user's interaction with the object. For example, in an online gaming context, if the environment object is a virtual store, and the event causing the updated store includes the addition of new virtual merchandise, the updated "store" may not be distributed to the user until the user "enters" the store—effectively updating the object on demand and subsequently updating the corresponding programming object to a "current" state, indicating the user has the most recent version of the environment object. Thus, according to an aspect of the invention, only when the user interacts with the specific "stale" environment object will the client device send a request to the server to create or otherwise update the state of the specific component for that client device. By spreading processing and network load in such a manner, I/O can be postponed (i.e., reading/writing all user-specific states to, for example, a database or the like) until the user actually needs to interact with that state of the environment object.

In some cases, a likelihood parameter may be calculated for users describing the likelihood that the user will encounter the updated environment object within some amount of time. For example, users that frequent a certain set of environment objects in a virtual environment or frequently use certain infrastructure elements (roads, bridges, etc.) can be prioritized and receive the updated object first (or ahead of the rest of the user population). In other examples, users that frequently interact with other users may receive updated profile information about or content from the other users before those that rarely or never interact with the other users.

While in some cases the updates may be sent immediately in response to a user's interaction with the environment object, in some cases the rules that govern the grouping of users and/or the distribution of the environment object updates may include a schedule parameter that determines the frequency and timing of the updates. The updates may be sent based on a time parameter such that each subsequent user group is updated at some interval (e.g., every minute), or according to a defined schedule, with certain groups being updated at specified times.

Figure 3:
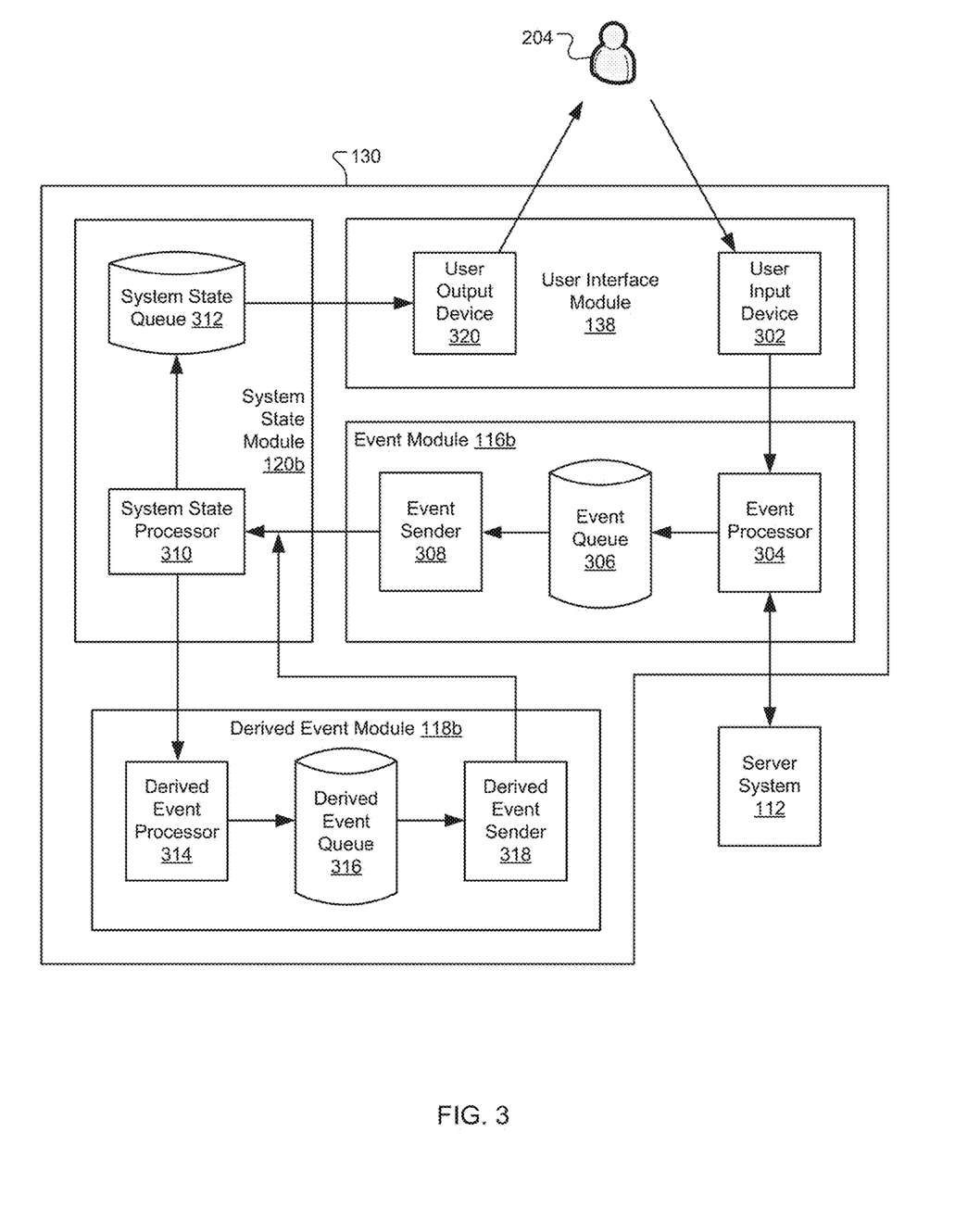
FIG. 3 is a schematic diagram of an example method of managing event data on a client device for a multi-user online system.

Referring to FIG. 3, in various examples, the client device 130 uses the user interface module 138, the event module 116b, the derived event module 118b, and the system state module 120b to process and/or manage event data for, for example, an online game or other online application. The user 204 can provide input to a user input device 302 of the user interface module 138. The user input device 302 can be or include, for example, a touch screen, a keyboard, a mouse, a joystick, or other game controller. The user input device 302 can process the user input and generate data corresponding to the user input. This data, which can be referred to herein as user input data, can be or include, for example, information derived from or describing the user input and/or an event (e.g., for the online game). The user input data can be sent from the user input device 302 to an event processor 304 in the event module 116b. Additionally or alternatively, user input data (e.g., game events) from other client devices can be sent from the server system 112 to the event processor 304. The event processor 304 can process the user input data to determine any events based on the user input data and/or based on any events generated on the server system 112. For example, the event processor 304 can determine a time at which one or more events will occur in an online game or other online application. The one or more events can be stored in an event queue 306, for example, according to a unique identification number for each event and/or according to a chronological order. An event sender 308 can monitor a time for the online application and can retrieve an event from the event queue 306 when the event is scheduled to occur. For example, when a time associated with the event is reached, the event sender 308 can remove the event from the event queue 306 and forward the event to a system state processor 310 in the system state module 120b.

The system state module 120b is generally configured to update a state of the online application according to events and derived events. For example, when the event sender 308 sends an event to the system state processor 310, the system state processor 310 can determine how the event changes the state and can update the state accordingly. A current state can be stored in a system state queue 312, along with one or more prior states. For example, the system state queue 312 can store a history of the game state. This can allow the game state to be reviewed or replayed at a later time, for example, by the user 204 and/or a game administrator.

When the system state processor 310 updates the state according to an event, the updated state and/or the event can be sent to the derived event module 118b, which can determine and process any derived events that occur due to the event and/or the updated state. For example, a derived event processor 314 can receive the updated game state and/or the game event and determine a time at which one or more derived game events will occur in the online game, as a result of the updated game state and/or the game event. Alternatively or additionally, the derived event processor 314 can recalculate derived events and/or delete certain derived events that will no longer occur, due to other intervening events. The one or more derived events can be stored in a derived event queue 316, for example, according to a unique identification number for each derived event and/or according to a chronological order. A derived event sender 318 can monitor a time and can retrieve a derived event from the derived event queue 316 when the derived event is scheduled to occur. For example, when a game time associated with a derived game event is reached, the derived event sender 318 can remove the derived game event from the derived event queue 316 and forward the derived game event to the system state processor 310, which can update the game state accordingly. As the state is updated over time, additional derived events can be processed using the derived event module 118b and implemented into, for example, an online game or other online application using the system state module 120b. In some implementations, the derived event module 118b can receive events directly from the event sender 308 and can determine and process derived events based on the received events.

As the state is updated and stored in the system state queue 312, a current state or a rendering thereof can be sent from the system state module 120b to a user output device 320 on the user interface module 138. The user output device 320 can be or include, for example, a display screen, a graphical user interface, a speaker, and/or a haptic feedback device. In preferred implementations, a rendering of the current state can be determined by the user interface module 138 and/or the system state module 120b and provided to the user 204 using the user output device 320. In response, the user 204 can provide additional user input to the user input device 302 and any corresponding events and/or derived events can be determined and processed to update the state accordingly. The process of updating the state based on events and derived events can continue until the online application (or a portion thereof) comes to an end.

Figure 4:
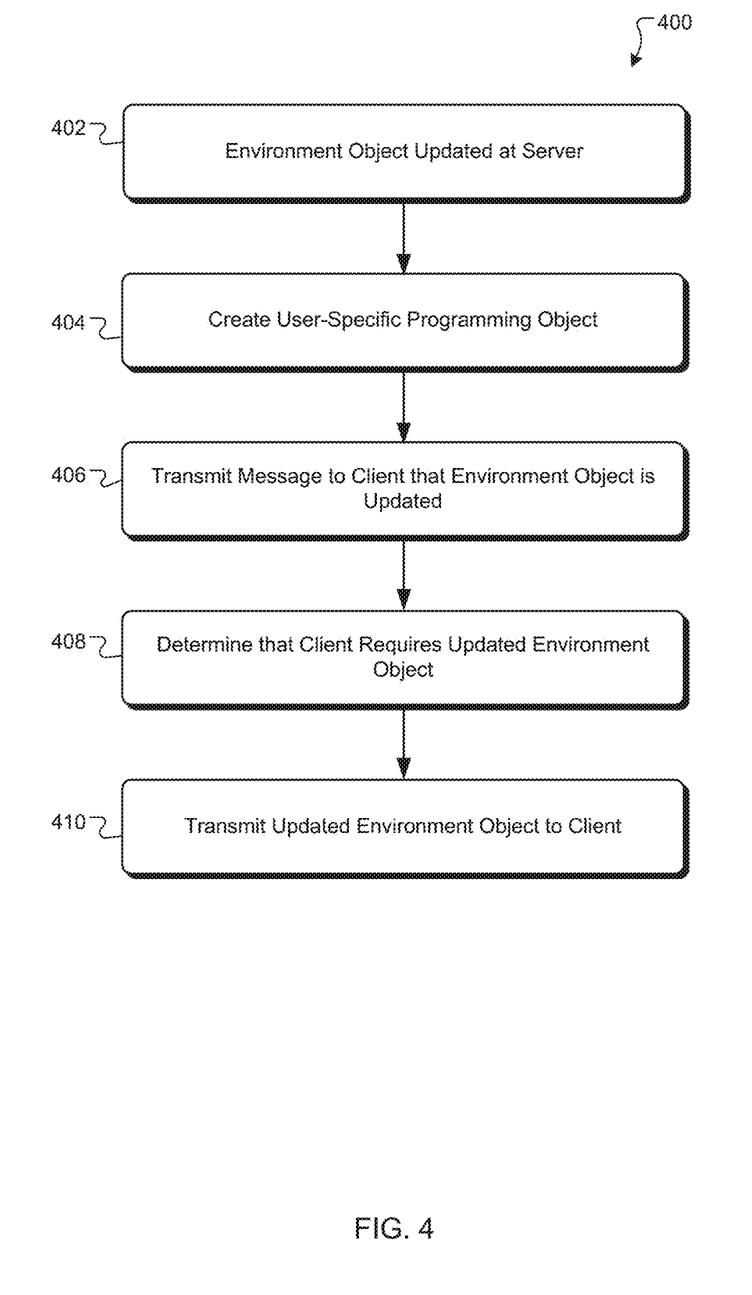
FIG. 4 is a flowchart of an example method of managing event data for a multi-user online system.

FIG. 4 illustrates an example computer-implemented method 400 of managing the distribution of updated environment objects used within an online application. The environment object is updated (based, for example, on user input or an application event) (step 402) at a server for the online application. A user-specific programming object is created (step 404) for the application indicating that the environment object requires updating at the client device on which the application is being used. A message is sent to the client device indicating that the environment object has been updated, and that the environment object at the client is "stale" (step 406). Based on a user state (e.g., interaction with the environment object, etc.), a determination is made that the client device needs the updated environment object (step 408). The updated environment object is transmitted to the client device (step 410) for use within the online application.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
    updating, by one or more computer processors on a server, an environment object for use within an online application on a client device to create an updated environment object;
    transmitting, by the one or more computer processors on the server, a message to the client device using the online application that the environment object has been updated;
    determining, by the one or more computer processors on the server, that the client device requires the updated environment object, based at least in part on a state of a user operating the client device and a state of a programming object, wherein (i) the programming object represents a combination of the environment object and the user state, and (ii) the user state comprises a likelihood that the user will encounter the updated environment object within a period of time; and
    transmitting, by the one or more computer processors on the server, the updated environment object to the client device when the state of the user indicates that the user interacted with the environment object.

2. The method of claim 1 wherein the determination that the client device requires the updated environment object is further based, at least in part, on message to the server indicating that a user of the client device is interacting with the environment object.

3. The method of claim 1 wherein the user state further comprises one of active or inactive.

4. The method of claim 1, wherein the user state further comprises the user being a member of a group of users having one or more commonalities.

5. The method of claim 1, wherein the determination that the client device requires the updated environment object is further based, at least in part, on a scheduled update of the environment object.

6. The method of claim 1, wherein the online application comprises one of an online multi-player game, a social network and a logistical application.

7. The method of claim 1, wherein the updated environment object comprises an updated collection of virtual items available for purchase.

8. The method of claim 1, wherein the updated environment object comprises updated content for the online application.

9. The method of claim 1, further comprising:
calculating a likelihood parameter, the likelihood parameter describing the likelihood that the user will encounter the updated environment object within a period of time,
wherein the determination of when the client device requires the updated environment object is further based on the likelihood parameter.

10. A system, comprising:
one or more computer processors on a server programmed to perform operations to:
update an environment object for use within an online application on a client device to create an updated environment object;
transmit a message to the client device using the online application that the environment object has been updated;
determine that the client device requires the updated environment object, based at least in part on a state of a user operating the client device and a state of a programming object, wherein (i) the programming object represents a combination of the environment object and the user state and (ii) the user state comprises a likelihood that the user will encounter the updated environment object within a period of time; and
transmit, by the one or more computer processors on the server, the updated environment object to the client device when the state of the user indicates that the user interacted with the environment object.

11. The system of claim 10, wherein the determination that the client device requires the updated environment object is further based, at least in part, on message to the server indicating that a user of the client device is interacting with the environment object.

12. The system of claim 10 wherein the user state further comprises one of active or inactive.

13. The system of claim 10 wherein the user state further comprises the user being a member of a group of users having one or more commonalities.

14. The system of claim 10, wherein the determination that the client device requires the updated environment object is further based, at least in part, on a scheduled update of the environment object.

15. The system of claim 10, wherein the online application comprises one of an online multi-player game, a social network and a logistical application.

16. The system of claim 10, wherein the updated environment object comprises an updated collection of virtual items available for purchase.

17. The system of claim 10, wherein the updated environment object comprises updated content for the online application.

18. The system of claim 10, the one or more computer processors on a server being further programmed to perform operations to:
calculate a likelihood parameter, the likelihood parameter describing the likelihood that the user will encounter the updated environment object within a period of time,
wherein the determination of when the client device requires the updated environment object the updated environment object is further based on the likelihood parameter.

19. A non-transitory computer-readable medium having instructions stored thereon that, when executed by one or more computer processors on a server, cause the computer processors to:
update, by the one or more computer processors on the server, an environment object for use within an online application on a client device to create an updated environment object;
transmit, by the one or more computer processors on the server, a message to the client device using the online application that the environment object has been updated;
determine that the client device requires the updated environment object, based at least in part on a state of a user operating the client device and a state of a programming object, wherein (i) the programming object represents a combination of the environment object and the user state, and (ii) the user state comprises a likelihood that the user will encounter the updated environment object within a period of time; and
transmit, by the one or more computer processors on the server, the updated environment object to the client device when the state of the user indicates that the user interacted with the environment object.

20. The non-transitory computer-readable medium of claim 19, wherein the instructions stored thereon further cause the computer processors to:
calculate a likelihood parameter, the likelihood parameter describing the likelihood that the user will encounter the updated environment object within a period a time,
wherein the determination of when the client device requires the updated environment object is further based on the likelihood parameter.

* * * * *